June 30, 1959 R. E. BACHMAN 2,892,357
SPEED REDUCING GEAR MECHANISM
Filed April 7, 1955

*INVENTOR.*
RUDOLPH E. BACHMAN
BY
*Leonard H. King*
AGENT

United States Patent Office 2,892,357
Patented June 30, 1959

2,892,357
SPEED REDUCING GEAR MECHANISM

Rudolph E. Bachman, Babylon, N.Y., assignor to Sterling Precision Instrument Corp., Flushing, N.Y.

Application April 7, 1955, Serial No. 499,862

5 Claims. (Cl. 74—421)

This invention relates to reducing gear mechanisms and in particular to such mechanisms suitable for use in conjunction with miniature servo motors.

It is frequently necessary to reduce the rotational speed of output shafts of servo motors employed in guided missiles, computors and automatic control mechanisms.

Conventional speed reducing mechanisms have two primary disadvantages. The output shaft of such mechanisms are generally off center from the shaft of the motor and secondly they occupy a large space. The space factor is regarded as of prime importance in many critical applications.

Accordingly, it is an object of this invention to provide an improved gear head which may be attached to a servo motor and which occupies but a minimum volume.

It is another object of this invention to provide a gear head which may be readily assembled.

Still another object of this invention is to provide a gear head having an output shaft in line with an input shaft.

A different object of this invention is to provide a gear train employing cantilevered shafts.

A particular object of this invention is to provide a gear train assembly which is adapted to permit a number of like units to be connected directly in cascade with a motor.

Other objects and advantages will be pointed out with particularity hereinafter and still others will become apparent from consideration of the following description taken in conjunction with the accompanying drawings.

Figure 1:
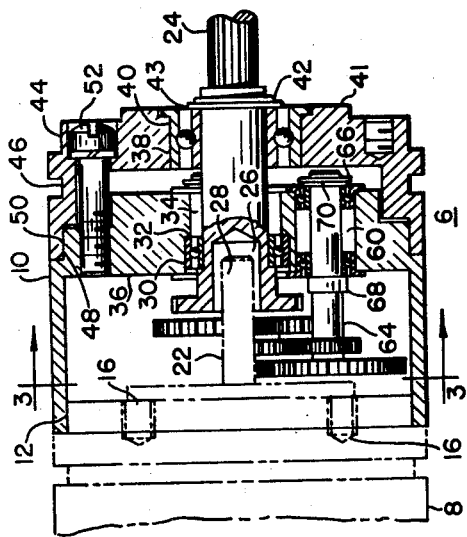
Figure 1 is an enlarged cross-sectional view of a reducing gear mechanism of this invention taken along lines 1—1 of Figure 2.

With reference to Figure 1 there is shown in phantom a portion 8 of a typical servo motor in conjunction with which it is intended to use the reducing gear mechanisms of this invention.

Cylindrical housing 10 fits over cylindrical stepped mounting means 12 of motor 8. Standard servo mount motors are provided with tapped holes 16 into which are inserted bolts (not shown) through holes 18 and 20 so that gear head 6 is securely fastened to the motor.

The standard military type servo motor is provided with a pinion 22 extending outwardly. A feature of this invention is the provision of a coaxial output shaft 24 for the gear head which has a bored portion 26 adapted to coaxially receive the end 28 of pinion 22 so as to permit the use of a shore gear head casing.

Hollow shaft 24 is mounted in radial ball bearing 30 located in stepped portion 32 of central opening 34 of bulkhead 36 and flanged radial ball bearings 38 located in central opening 40 of end member 41. Retaining ring 42 in combination with shims 43 prevent axial movement of shaft 24.

End member 41 is provided with a stepped diameter 44 which serves as a pilot dimension and servo mount recess 46. Internally stepped portion 48 fits over externally stepped diameter 50 of bulkhead 36. Bolts 52 and 54 attach end member 41 to member 10 and bulkhead 36.

A number of mounting holes 60 are provided in bulkhead 36. In each mounting hole 60 there is fitted a pair of flanged radial ball bearings 62. Supported in flanged bearings 62 there is provided a cantilevered shaft 64. Retaining ring 66 in a suitable groove in the shaft 64 prevents axial movement of the shaft in one direction. In the other direction, movement is prevented by stepped portion 68.

Figure 4:
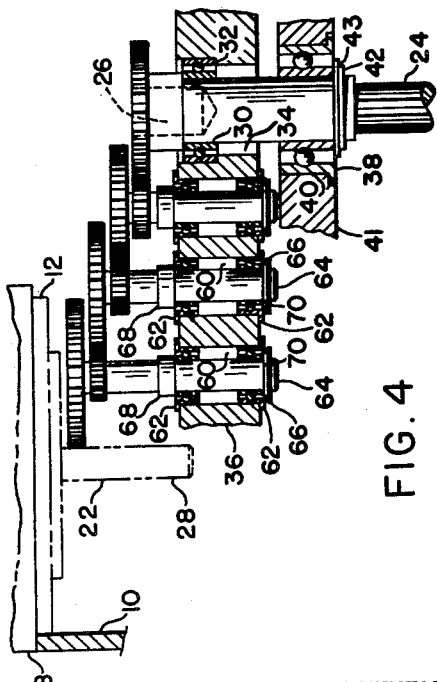
Figure 4 is a developed view of a typical gear train employed in the mechanisms of this invention.
Figure 3:
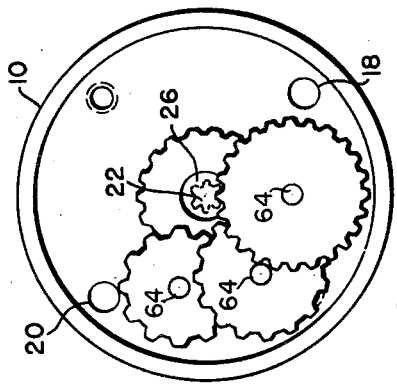
Figure 3 is a cross-sectional view taken in plane 3—3 of Figure 1.

Fitted to each shaft 64 there is a pair of spurred gears forming links with a gear train extending from pinion 22 to output shaft 24 as is clearly apparent from Figure 4. Shims 70 may be employed to compensate for variations in manufacturing.

The use of a single bulkhead as a support for the cantilevered shafts makes assembly a simplified procedure. In contrast the use of conventional parallel supporting plates with shafts interposed makes assembly difficult.

Figure 2:
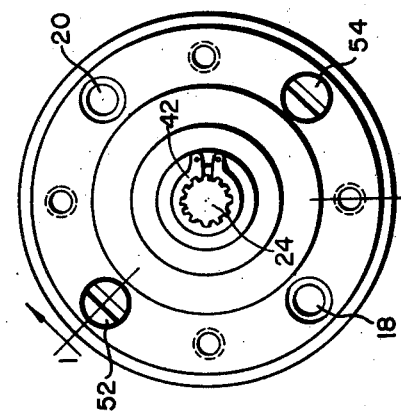
Figure 2 is an end view of the gear mechanism of this invention.
Figure 5:
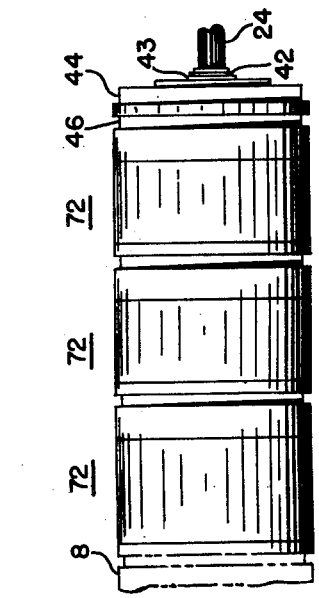
Figure 5 shows three identical mechanisms of this invention connected in tandem.

It will be noted that shaft 24 is in the form of a pinion. This permits assembling a number of standard gear trains in tandem to provide a large overall gear ratio. By way of example, in Figure 5 there is shown three identical units 72 assembled to a motor 8.

It is to be understood that shaft 24 may be of the conventional round type if the cascading feature is not desired.

While I have disclosed what is currently the best mode contemplated for carrying out my invention it is to be understood that modifications may be made by those familiar with the art, without departing from the spirit of the invention and therefore I wish to be limited only by the accompanying claims.

What I claim as new is:

1. A precision gear ratio reducing mechanism adapted to be used with miniature motors having a motor housing provided with a stepped mounting means, a motor output shaft extending from said motor housing, and a pinion mounted on said shaft and arranged to be rotated thereby, comprising: a gear housing adapted to be mounted onto said stepped mounting means, a bulkhead member attached to said gear housing and having provided therein a centrally located bearing means and a plurality of spaced bearing means radially positioned with respect to said centrally located bearing means, a gear train output shaft rotatably mounted in said centrally located bearing means, a gear carried by said gear train output shaft so as to be rotated thereby, cantilevered shafts having one end rotatably mounted in said spaced bearing means and the other end extending outwardly of said bulkhead, a pair of gears attached to each of said outwardly extending ends of said shafts, each of said gears engaging an adjacent gear so as to form a continuous cascaded gear train extending from said pinion to said gear carried by said gear train output shaft, and means to prevent axial displacement of said shafts.

2. A precision gear ratio reducing mechanism adapted to be used with miniature motors having a motor housing provided with a stepped mounting means, a motor output shaft extending from said motor housing, and a pinion mounted on said shaft and arranged to be rotated thereby comprising: a gear housing adapted to be mounted onto said stepped mounting means, a bulkhead member attached to said gear housing and having provided therein a first centrally located bearing means and a plurality of spaced bearing means radially positioned with respect to said first centrally located bearing means, an end member, having a second centrally located bearing, attached to said bulkhead member and aligned so that said centrally located bearing means have a common axis, a gear train output shaft rotatably mounted in said centrally located bearing means and adapted to coaxially enclose a portion of said motor output shaft, a gear carried by said gear train output shaft so as to be rotated thereby, cantilevered shafts having one end rotatably mounted in said spaced bearing means and the other end extending outwardly of said bulkhead, a pair of gears attached to each of said outwardly extending ends of said shafts, each of said gears engaging an adjacent gear so as to form a continuous cascaded gear train extending from said pinion to said gear carried by said gear train output shaft, and means to prevent axial displacement of said shafts.

3. A gear ratio reducing mechanism adapted to be used in combination with miniature motors and the like, comprising in combination: a supporting bulkhead provided with a centrally located bearing means and a plurality of spaced bearing means radially deployed with respect to said centrally located bearing means, cantilevered shafts having one end rotatably positioned in each of said spaced bearing means and one end extending outwardly of said bulkhead, means to prevent axial movement of said cantilevered shafts, a pair of gears mounted on each of said outwardly extending ends of said cantilevered shafts, each of said gears being arranged to engage an adjacent gear so as to form a cascaded gear train, an output shaft provided with a coaxial bore rotatably supported by said centrally positioned bearing means, means to prevent axial movement of said output shaft, and a gear attached to said output shaft and arranged to engage said cascaded gear train.

4. A gear ratio reducing mechanism adapted to be used in combination with miniature motors and the like, comprising in combination: a supporting bulkhead provided with a centrally located bearing means and a plurality of spaced bearing means radially deployed with respect to said centrally located bearing means, cantilevered shafts having one end rotatably positioned in each of said spaced bearing means and one end extending outwardly of said bulkhead, means to prevent axial movement of said cantilevered shafts, a pair of gears mounted on each of said outwardly extending ends of said cantilevered shafts, each of said gears being arranged to engage an adjacent gear so as to form a cascaded gear train, an output shaft rotatably supported by said centrally positioned bearing means, means to prevent axial movement of said output shaft, and a gear attached to said output shaft and arranged to engage said cascaded gear train.

5. A gear ratio reducing mechanism adapted to be used in combination with miniature motors and the like, comprising in combination: a supporting bulkhead provided with a centrally located bearing means and a plurality of spaced bearing means radially deployed with respect to said centrally located bearing means, cantilevered shafts having one end rotatably positioned in each of said spaced bearing means and one end extending outwardly of said bulkhead, means to prevent axial movement of said cantilevered shafts, a pair of gears mounted on each of said outwardly extending ends of said cantilevered shafts, each of said gears being arranged to engage an adjacent gear so as to form a cascaded gear train, a centrally positioned bearing member located in said central opening, an output shaft provided with a coaxial bore rotatably supported by said centrally positioned bearing means, means to prevent axial movement of said output shaft, and a gear attached to said output shaft and arranged to engage said cascaded gear train.

References Cited in the file of this patent

UNITED STATES PATENTS

| | | |
|---|---|---|
| 693,837 | Canedy | Feb. 25, 1902 |
| 1,785,798 | Weiss | Dec. 23, 1930 |
| 2,065,753 | Schmitter | Dec. 29, 1936 |
| 2,073,348 | Merkle | Mar. 9, 1937 |
| 2,528,836 | Le Tourneau | Nov. 7, 1950 |